(12) United States Patent
Rodriguez et al.

(10) Patent No.: US 9,222,697 B2
(45) Date of Patent: Dec. 29, 2015

(54) WATER HEATER WITH CENTERING THERMAL BREAK SUPPORT

(75) Inventors: Eliel Fresco Rodriguez, Dayton, OH (US); Samuel V. DuPlessis, Louisville, KY (US)

(73) Assignee: General Electric Company, Schenectady, NY (US)

(\*) Notice: Subject to any disclaimer, the term of this patent is extended or adjusted under 35 U.S.C. 154(b) by 354 days.

(21) Appl. No.: 13/532,867

(22) Filed: Jun. 26, 2012

(65) Prior Publication Data

US 2013/0340690 A1 Dec. 26, 2013

(51) Int. Cl.
| | |
|---|---|
| F24H 9/02 | (2006.01) |
| F24H 1/18 | (2006.01) |
| F28D 20/00 | (2006.01) |
| F24H 4/04 | (2006.01) |

(52) U.S. Cl.
CPC ............... F24H 1/182 (2013.01); F24H 1/181 (2013.01); F28D 20/00 (2013.01); F24H 4/04 (2013.01)

(58) Field of Classification Search
CPC ............. F24H 1/182; F24H 9/02; F24H 9/06; F24H 9/148; F24H 1/181; F24H 9/0073; A47G 33/126; A47G 33/1226; A47G 33/1233; F28D 20/00

USPC ............ 122/19.2, 494, 510; 220/567, 567.1, 220/694.1

See application file for complete search history.

(56) References Cited

U.S. PATENT DOCUMENTS

| | | | | | |
|---|---|---|---|---|---|
| 3,722,732 | A | * | 3/1973 | Edlund | 220/623 |
| 4,452,226 | A | * | 6/1984 | Daugirda et al. | 122/19.2 |
| 5,115,767 | A | * | 5/1992 | West et al. | 122/19.2 |
| 5,924,392 | A | * | 7/1999 | Hall | 122/494 |
| 6,010,108 | A | * | 1/2000 | Welzen | 248/527 |
| 6,267,261 | B1 | * | 7/2001 | Lesage | 220/567.3 |
| 6,419,200 | B1 | * | 7/2002 | Tuneld et al. | 248/514 |
| 6,588,378 | B1 | * | 7/2003 | Henderson et al. | 122/19.2 |
| 7,765,959 | B2 | | 8/2010 | Syler | |
| 7,913,684 | B2 | * | 3/2011 | Butler | 126/589 |
| 2010/0275444 | A1 | * | 11/2010 | Syler | 29/890.03 |
| 2012/0128337 | A1 | * | 5/2012 | Rahmani et al. | 392/441 |

\* cited by examiner

*Primary Examiner* — Steven B McAllister
*Assistant Examiner* — Steven Anderson, II
(74) *Attorney, Agent, or Firm* — Dority & Manning, P.A.

(57) ABSTRACT

A water heater is provided that includes a centering ring or thermal barrier that facilitates centering or alignment of the water tank while also diminishing heat loss through the bottom of the water heater. Features are provided with the bottom of the water heater and centering ring that can also improve the stability of the water heater when placed in a vertically upright position.

18 Claims, 5 Drawing Sheets

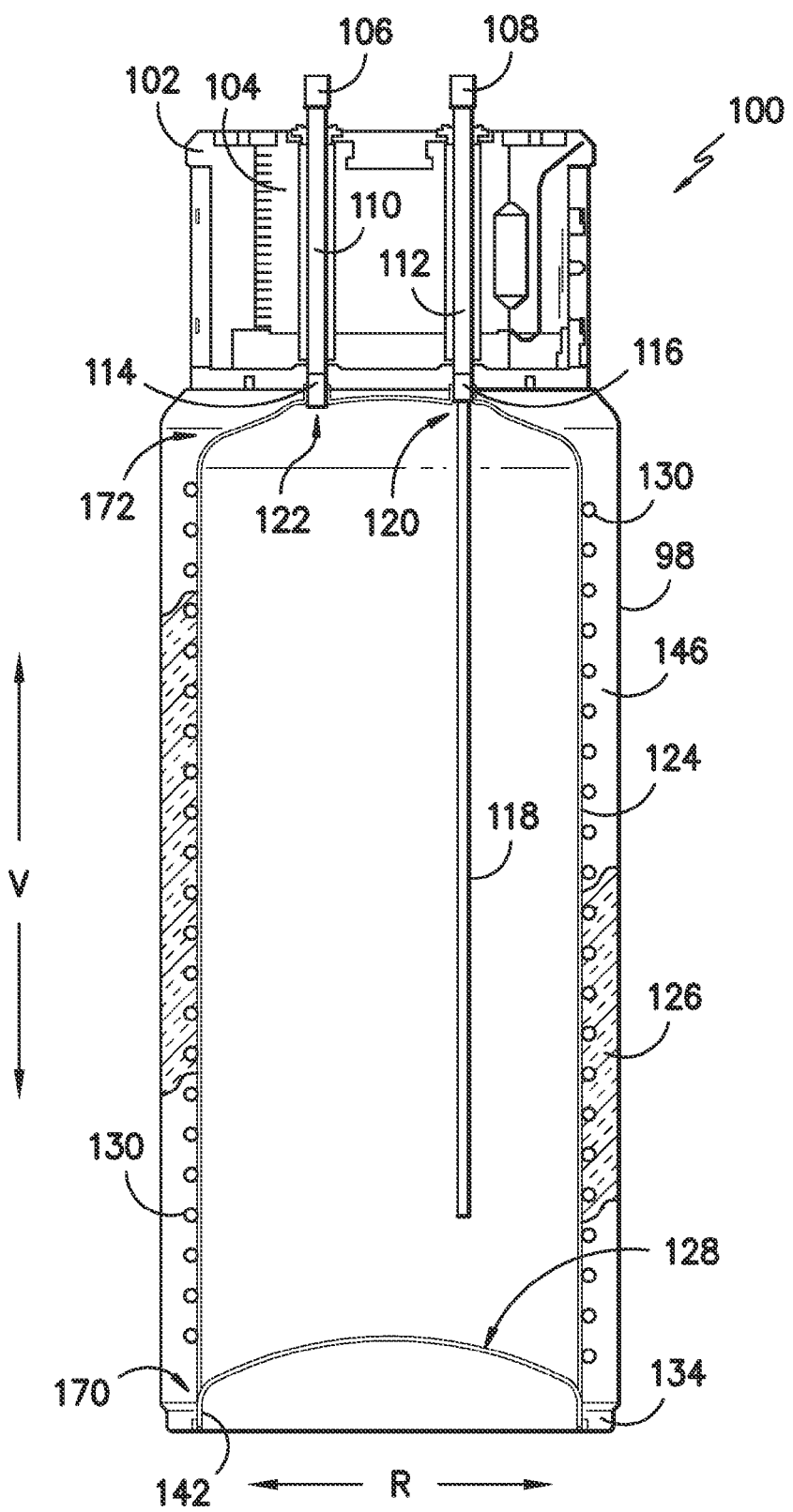
FIG. -1-

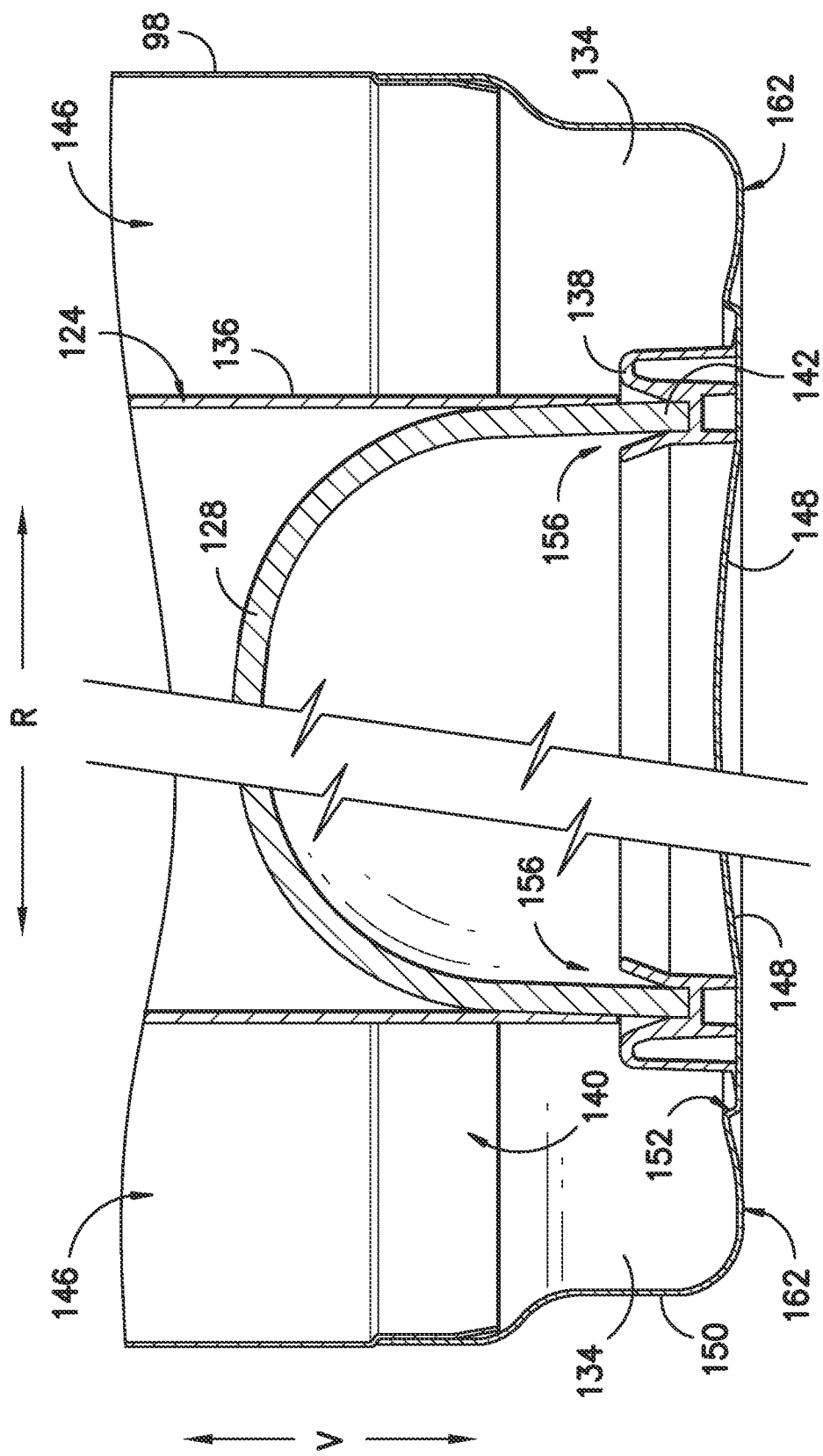
FIG. -2-

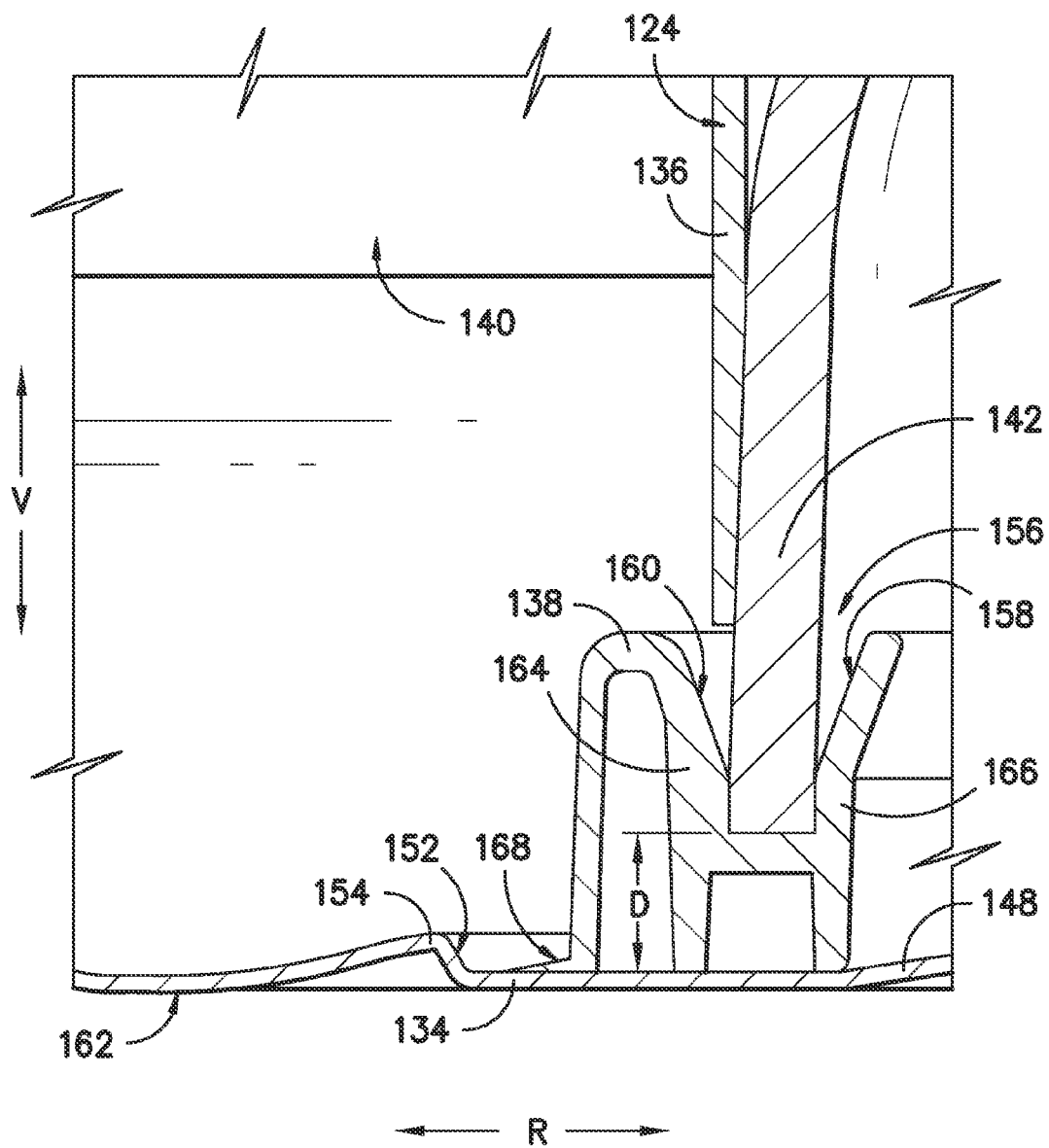
FIG. -3-

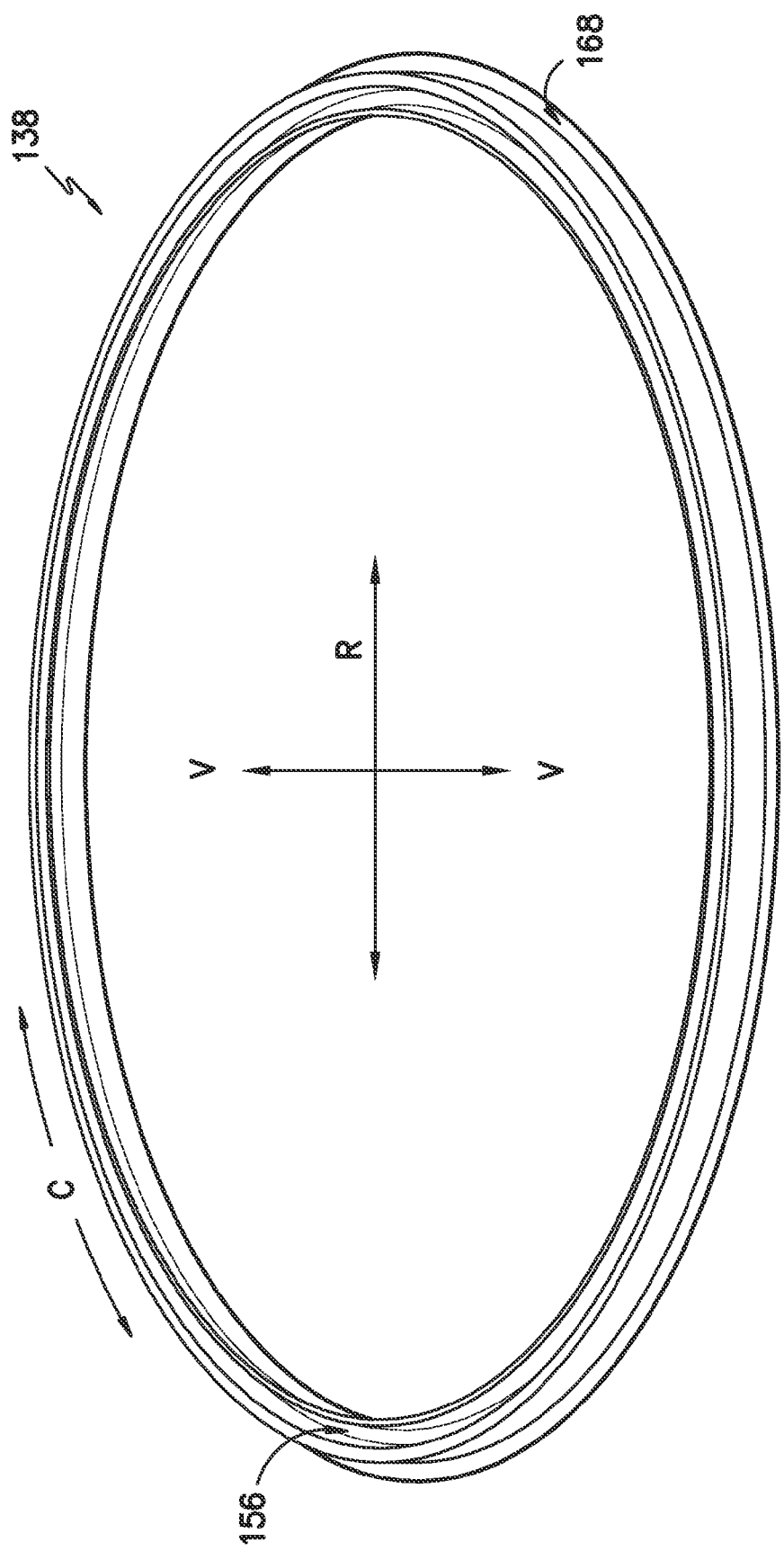
FIG. -4-

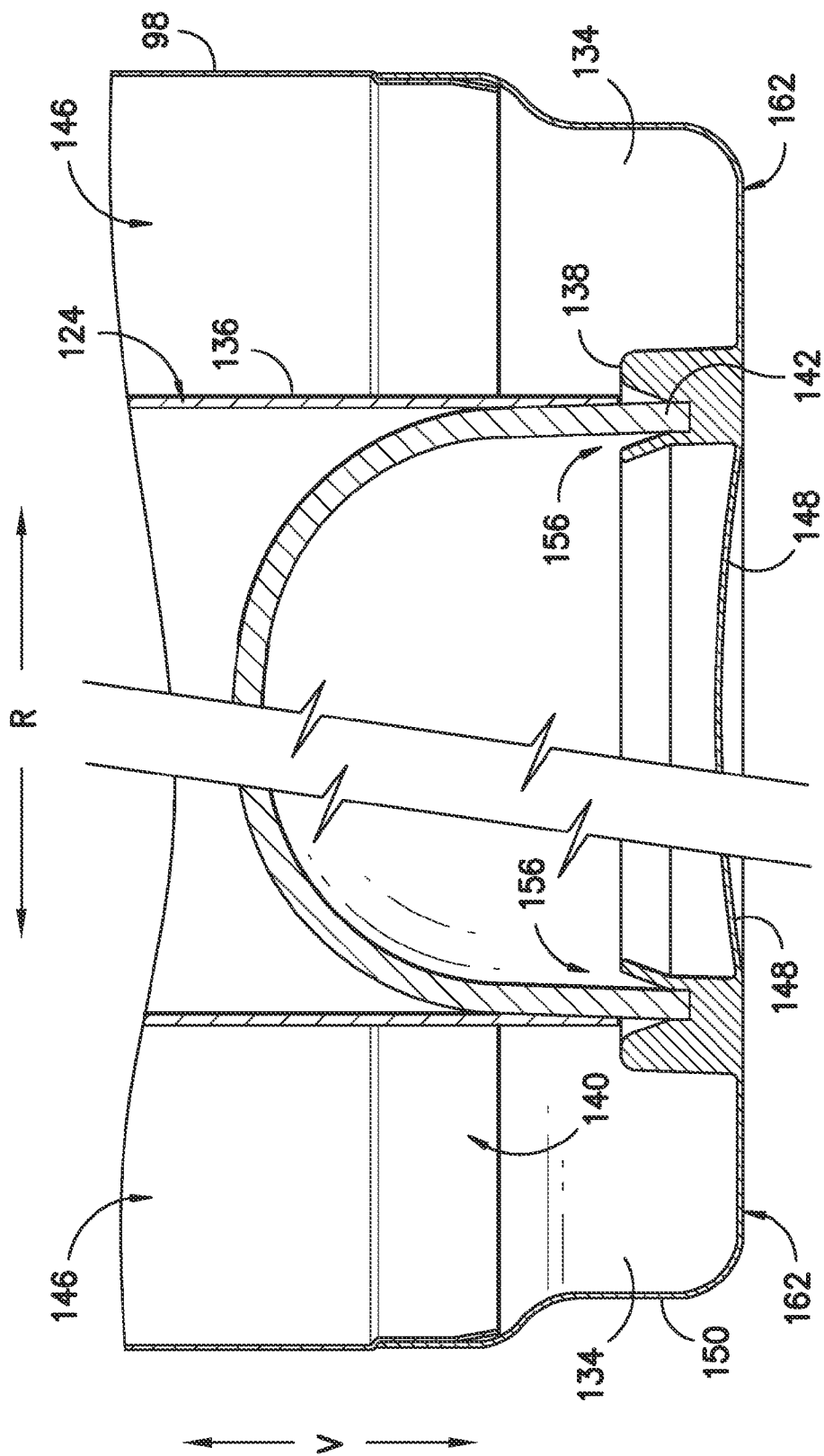

WATER HEATER WITH CENTERING THERMAL BREAK SUPPORT

FIELD OF THE INVENTION

The subject matter of the present disclosure relates generally to a water heater having a thermal break that provides support and centering for the water tank.

BACKGROUND OF THE INVENTION

Water heaters can provide for the heating and storage of water to be used in e.g., a residential or commercial structure. Typically, a water tank is surrounded by a jacket and is insulated. A heat source is provided for raising the temperature of water in the tank. The heat energy may be supplied e.g., by gas burners, electrically-resistant coils, or a heat pump using a refrigerant cycle. The tank is commonly insulated along at least one the side walls to allow storage of the heated water until use. However, a significant heat loss can also occur through the bottom of the tank where insulation is sometimes not installed and where contact may be made directly with e.g., the ground, a concrete floor, or other surface that can conduct heat away from the tank.

A water heater is generally provided with an inlet for receipt of unheated water and with an outlet for delivery of heated water. During installation, the inlet and outlet are connected with e.g., the piping system of a residential or commercial structure. Depending upon the location of the inlet and outlet connections on the water heater, additional piping and/or modifications to the existing piping system may be necessary for both original installations as well as replacement installations in order to connect with such piping system. Furthermore, because the locations of the inlet and outlet may vary between different water heaters of the same capacity particularly when provided by different manufacturers, each installation can require different materials and configurations customized to such installation—thereby increasing the costs of the installation.

While water heaters can be provided in a variety of shapes and sizes, a typical shape includes an elongated cylindrical tank that is configured for a vertically upright position. However, the bottom of the tank may not be best suited for supporting the vertically upright position. This can be particularly true where weight is added to the top of the tank (such as a heating unit) and/or when the tank is not filled with water such as e.g., during installation or display in a retail location.

Accordingly, a water heater having one or more features that help insulate the bottom of the water tank would be useful. A water heater that can include a water inlet and outlet consistently positioned for connection to the piping system of e.g., commercial or residential structure would also be beneficial. Such a water heater that can also have features that improve its stability in the vertically-upright position would also be useful.

BRIEF DESCRIPTION OF THE INVENTION

A water heater is provided that includes a centering ring or thermal barrier that facilitates consistent alignment and centering of the water tank while also diminishing heat loss through the bottom of the water heater. Features are provided with the bottom of the water heater and centering ring that can also improve the stability of the water heater when placed in a vertically upright position. Additional aspects and advantages of the invention will be set forth in part in the following description, or may be apparent from the description, or may be learned through practice of the invention.

In one exemplary embodiment, the present invention provides a water heater that includes a tank having a bottom, a top, a water inlet, and a water outlet. The tank also defines vertical and radial directions. A heating source is in thermal communication with the tank. A jacket surrounds at least a portion of the tank. The jacket has a bottom opening. The bottom of the tank is positioned onto a thermal barrier. A bottom cover is positioned at the bottom opening of the jacket to close off the bottom opening. The bottom cover includes a base upon which the thermal barrier is received. The base defines a lip having a lead-in surface extending around and radially outside of the thermal barrier. The lead-in surface is oriented towards the bottom of the tank. A cylindrical wall portion extends around the thermal barrier and projects along the vertical direction away from the base and towards the jacket.

In another exemplary embodiment, the present invention provides a water heater that includes a tank for storing water. The tank defines a circular bottom edge. An outer jacket surrounds the tank and defines an annular space between the tank and the outer jacket. Insulation is positioned into the annular space. A centering ring is provided onto which the tank is positioned. The centering ring includes a base having a ground contacting portion located radially outward of the circular bottom edge of the tank and a circular pocket into which the circular bottom edge of the tank is received.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a cross-sectional side view of an exemplary embodiment of a water heater of the present invention.

FIG. 2 is a cross-sectional view of the bottom of the exemplary water heater of FIG. 1 with break lines to indicate that a middle portion of the bottom has been removed for purposes of illustration.

FIG. 3 is close-up of a portion of the cross-sectional view of FIG. 2.

FIG. 4 is a perspective view of an exemplary embodiment of a thermal barrier or centering ring of the present invention.

FIG. 5 is another cross-sectional view of an alternative bottom for the exemplary water heater of FIG. 1 with break lines to indicate that a middle portion of this alternative bottom has been removed for purpose of illustration.

The use of same or similar reference numerals in the figures indicates same or similar features.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a cross-sectional view of an exemplary embodiment of a water heater 100 of the present invention. Water heater 100 includes a tank 124 for storing water that has been heated using heat source 104. Tank 124 is shown in a vertically upright position as indicated by vertical direction V. Tank 124 has a cylindrically-shaped body extending vertically between a bottom 170 and a top 172. Bottom 170 includes bottom tank wall 128 suitably joined to the lower extremity of cylindrical wall 136 of tank 124 such as by welding and having a circular bottom edge 142 which projects downwardly beyond the lower edge of tank wall 136.

Top 172 includes a water outlet 122 with associated coupling 114 and a water inlet 120 with coupling 116. Couplings 114 and 116 connect with conduits 110 and 112 that extend through housing 102 for heat source 104. In turn, conduits 110 and 112 can each be fitted with couplings 106 and 108 for connection of water heater 100 to the piping or plumbing associated with a water supply system of e.g., a commercial or residential structure. Coupling 106 would be connected with e.g., a pipe delivering a pressurized water supply that flows into tank 124 using dip tube 118. In turn, heated water is returned to such piping system through the connection provided by coupling 106.

For this exemplary embodiment, heat source 104 is shown as a refrigerant based heat pump that circulates hot refrigerant through coils 130 to transfer heat to water in tank 124. However, the present invention is not limited to heat pump water heaters. As will be understood by one of skill in the art using the teachings disclosed herein, the present invention may also be used with e.g., water heaters that rely upon electric resistance heating elements, gas burners, and other heat sources as well.

Tank 124 is positioned within a wrapper or jacket 98 that surrounds the tank to create an annular space 146. Insulation 126 is provided within annular space 146 to reduce the amount of heat transfer to the environment. Insulation 126 can be provided as foamed-in insulation but other materials may be used as well. Referring to FIGS. 1 and 2, jacket 98 defines a bottom opening 140 through which tank 124 is received. A bottom cover 134 is positioned at the bottom opening 140 and closes off opening 140 as well.

For reasons previously stated, it is desirable to provide couplings 106 and 108 (or other connection features) at a consistent location and height for water heaters 100 having the same capacity. Such consistency can improve the efficiency of the installation process by avoiding steps and/or parts that result where each installation of a water heater must be customized. For example, if each water heater 100 having a tank with a 75 gallon capacity is manufactured with connection features such as couplings 106 and 108 at the same height and location, the piping system of residential or commercial structure can be provided with connection points that are positioned accordingly so as to expedite the installation process for an original as well as replacement water heater.

In order to provide couplings 106 and 108 (or, in an alternative embodiment, e.g., the ends of conduits 110 and 112) at a consistent or uniform height and position on water heater 100, the outlet 122 and inlet 120 of tank 124 must also be properly centered within jacket 98 and correctly aligned and connected with conduits 106 and 108. Accordingly, referring now to FIGS. 2 and 3, water heater 100 includes a thermal barrier or centering ring 138 on which tank 124 rests. More specifically, tank 124 includes a circular bottom edge 142 that is received into a pocket 156 defined by centering ring 138.

As shown, pocket 156 includes a base 148 that extends along radial direction R. Base 148 is slightly arcuate along its middle and includes a ground contacting portion 162 that is located radially outward of the circular bottom edge 142 of tank 124 and extends circumferentially about base 148. The ground contacting portion 162 rests upon a floor or ground surface and helps support tank 124. More specifically, because ground contacting portion 162 is located radially outward of the bottom edge of tank 124 and extends in a substantially horizontal manner, portion 162 improves the stability of water heater 100 when positioned vertically upright as shown in FIG. 1.

Bottom cover 134 also includes a cylindrical wall portion 150 that extends circumferentially around centering ring 138 and projects along vertical direction V away from base 148 and in a direction towards jacket 98. Wall portion 150 connects with the bottom of jacket 98 as shown. Other configurations for connection of wall portion 150 and jacket 98 may be used as well.

A lip 154 is provided by bottom cover 134. Lip 154 provides a frustoconically-shaped lead-in surface 152. As shown in FIG. 3, lead-in surface 152 is oriented towards the bottom 170 of tank 124 and centering ring 138. During assembly, lip 154 helps align or center the centering ring 138 when it is placed onto base 148 of bottom cover 134. Shapes other than frustoconical may be used for lead-in surface 152 including e.g., arcuate or parabolic shapes.

As stated, centering ring 138 provides a pocket 156 for the receipt of the bottom edge 142 of tank 124. Referring to FIGS. 3 and 4, pocket 156 is annular or extends about circumferential direction C. Pocket 156 includes an inner lead-in surface 158 positioned radially inward of edge 142. An outer lead-in surface 160 is provided radially outside of edge 142 such that surface 158 and 160 are positioned in an opposing manner about edge 142. For this exemplary embodiment, surfaces 158 and 160 are angled or offset from the vertical direction and are frustoconical in shape. Other shapes, however, may also be used.

During assembly, lead in surfaces 158 and 160 assist with properly positioning tank 124 into centering ring 138. More particularly, as edge 142 is moved into pocket 156, lead-in surfaces 158 and 160 guide edge 142 for complementary receipt into a position between the pair of opposing walls 164 and 166. As shown, walls 164 and 166 are linear in shape and extend substantially along the vertical direction V.

Centering ring 138 also acts a thermal barrier in that it insulates or provides a thermal break between the bottom 170 of tank 124 and the bottom cover 134. Not only is ring 138 positioned between tank 124 and a ground or floor surface so as to reduce thermal conduction, annular pocket 156 is elevated by a vertical distance D (FIG. 3) to further insulate or thermally isolate tank 124. Although pocket 156 is shown extending continuously along the circumferential direction, in an alternative embodiment of the invention, pocket 156 and edge 142 can be constructed in complementary segments or portions as well.

For the exemplary embodiment shown in the figures, centering ring 138 is constructed from a durable plastic material, which provides further insulation against heat loss from tank bottom 170. By way of example, polypropylene may be used in the construction of ring 138. However, other plastics may be used as well.

As indicated above, during assembly, annular space 146 may be filled with a foamed-in insulation 126. In one exemplary method of construction, a precursor foam material is injected into annular space 146. This foam expands substantially to form insulation 126. To contain the precursor foam material, centering ring 138 is provided with a beveled edge 168 that extends circumferentially around the periphery of ring 138 and is positioned into contact with bottom cover 134.

In the exemplary embodiments of FIGS. 2, 3, and 4, centering ring 138 and bottom cover 134 are provided as separate components. However, as shown in the exemplary embodiment of FIG. 5, centering ring 138 and bottom cover 134 can be provided as an integral construction by e.g., plastic molding. In such an embodiment, lip 154 is no longer necessary and may be excluded. Otherwise, all other features shown in FIG. 5 are as described with regards to the exemplary embodiment of FIGS. 2, 3, and 4.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater comprising:
   a tank comprising a bottom, a top, a water inlet, and a water outlet, said tank also defining vertical and radial directions;
   a heating source in thermal communication with said tank;
   a jacket surrounding at least a portion of said tank, said jacket having a bottom opening;
   a thermal barrier onto which the bottom of said tank is positioned;
   a bottom cover positioned at the bottom opening of said jacket to close off the bottom opening, said bottom cover comprising:
   a base upon which said thermal barrier is received, the base defining a lip having a lead-in surface extending around and radially outside of said thermal barrier, the lead-in surface being oriented towards the bottom of said tank and configured to help center the thermal barrier on the base, the base comprising an upwardly arcuate middle portion, extending upwardly towards the bottom of the tank, disposed radially inward from the lip such that the upwardly arcuate middle portion is configured to help center the thermal barrier; and
   a cylindrical wall portion extending around said thermal barrier and projecting along the vertical direction away from the base and towards said jacket,
   wherein the lip is spaced apart from the cylindrical wall portion.

2. A water heater as in claim 1, wherein said thermal barrier is located between the bottom of said tank and said bottom cover and is configured to insulate the bottom of said tank against heat loss through said bottom cover.

3. A water heater as in claim 1, wherein said thermal barrier is located between the bottom of said tank and said bottom cover, and wherein said thermal barrier and said bottom cover are integrally formed.

4. A water heater as in claim 3, wherein said thermal barrier and said bottom cover comprise a plastic material.

5. A water heater as in claim 1, wherein the lead-in surface of said lip is frustoconical in shape.

6. A water heater as in claim 1, wherein said thermal barrier farther comprises a pocket extending circumferentially about said thermal barrier, and wherein the bottom of said tank defines an edge extending along, the vertical direction into the pocket of said thermal barrier.

7. A water heater as in claim 6, wherein the pocket of said thermal barrier includes an inner lead-in surface positioned radially inside of the edge on the bottom of said tank.

8. A water heater as in claim 7, wherein the pocket of said thermal barrier further includes an outer lead-in surface positioned radially outside of the edge on the bottom of said tank.

9. A water heater as in claim 8, wherein said inner lead in surface and said outer lead-in surface are both frustoconical in shape.

10. A water heater as in claim 6, wherein the pocket of said thermal barrier is vertically displaced from said bottom cover.

11. A water heater as in claim 1, wherein said thermal barrier includes a beveled edge extending around a periphery of said thermal barrier and positioned upon said bottom cover.

12. A water heater as in claim 1, wherein the water inlet and water outlet are positioned at the top of said tank.

13. A water heater as in claim 1, wherein said heating source is positioned on top of said tank.

14. A water heater comprising:
    a tank for storing water, the tank defining a circular bottom edge;
    an outer jacket surrounding said tank and defining an annular space between said tank and said outer jacket, said outer jacket having a bottom opening;
    insulation positioned in the annular space;
    a heating source in thermal communication with said tank;
    a bottom cover positioned at the bottom opening of said outer jacket to close off the bottom opening, the bottom cover comprising a base having an upwardly arcuate shape extending upwardly towards the bottom of the tank along its middle and a ground contacting portion located radially outside of the circular bottom edge of the tank;
    a centering ring onto which sad tank is positioned, said centering ring being disposed on the bottom cover and the centering ring is centered on the bottom cover by the upwardly arcute portion and a circular lip of the bottom cover, said centering ring comprising;
    an annular pocket into which the circular bottom edge of said tank is received.

15. A water heater as in claim 14, wherein the annular pocket of said centering ring comprises:
    a pair of opposing was extending substantially along the vertical direction and configured for complementary receipt of the circular bottom edge of said tank.

16. A water heater as in claim 15, wherein the annular pocket of said centering ring further comprises:
    an inner lead-in wall that is offset from the vertical direction;
    an outer lead-in wail that, is offset set from the vertical direction and positioned in an
    opposing manner to the inner lead in wall with the circular bottom edge of the tank positioned between the inner lead in wall and the outer lead-in wall.

17. A water heater as in claim 16, wherein the inner lead-in wall and the outer lead-in wail are each frustoconical in shape.

18. A water heater as in claim 17, wherein the annular pocket is vertically displaced relative to the contacting portion of the base of said centering ring.

\* \* \* \* \*